(12) United States Patent
Seidler et al.

(10) Patent No.: US 11,684,214 B2
(45) Date of Patent: Jun. 27, 2023

(54) STAND MIXER ARRANGEMENTS

(71) Applicant: KENWOOD LIMITED, Havant (GB)

(72) Inventors: Mark Seidler, Havant (GB); Jamie Weaden, Havant (GB)

(73) Assignee: KENWOOD LIMITED, Havant (GB)

( * ) Notice: Subject to any disclaimer, the term of this patent is extended or adjusted under 35 U.S.C. 154(b) by 48 days.

(21) Appl. No.: 17/367,999

(22) Filed: Jul. 6, 2021

(65) Prior Publication Data

US 2021/0330128 A1 Oct. 28, 2021

Related U.S. Application Data

(63) Continuation of application No. 16/164,170, filed on Oct. 18, 2018, now Pat. No. 11,096,524, which is a continuation of application No. 15/110,237, filed as application No. PCT/GB2015/050039 on Jan. 9, 2015, now Pat. No. 10,542,843.

(30) Foreign Application Priority Data

Jan. 9, 2014 (GB) ...................................... 1400345

(51) Int. Cl.
*A47J 43/07* (2006.01)
*A47J 43/044* (2006.01)

(52) U.S. Cl.
CPC .. *A47J 43/0705* (2013.01); *A47J 2043/04454* (2013.01)

(58) Field of Classification Search
CPC ........ B01F 27/81; A47J 43/07; A47J 43/0705; A47J 2043/04481
See application file for complete search history.

(56) References Cited

U.S. PATENT DOCUMENTS

| | | | |
|---|---|---|---|
| 2,275,878 | A | 3/1942 | Allenby |
| 2,440,041 | A | 4/1948 | Clark |
| 2,517,648 | A | 8/1950 | Franke |
| 2,525,588 | A | 10/1950 | Cameron et al. |
| 3,904,178 | A | 9/1975 | Scott et al. |
| 4,277,181 | A | 7/1981 | Stahly et al. |

(Continued)

FOREIGN PATENT DOCUMENTS

| | | |
|---|---|---|
| CN | 1448101 A | 10/2003 |
| CN | 2659310 Y | 12/2004 |

(Continued)

OTHER PUBLICATIONS

International Search Report and Written Opinion of the International Searching Authority for PCT/GB2015/050039, dated Mar. 25, 2015; ISA/EP.

(Continued)

*Primary Examiner* — Elizabeth Insler
(74) *Attorney, Agent, or Firm* — Harness, Dickey & Pierce, P.L.C.

(57) ABSTRACT

A stand mixer arrangement includes a pedestal for a mixing bowl; an electric motor and a drive system including a rotary drive outlet disposed overhead of the bowl, capable of imparting a mixing action to a tool suspended into the bowl from a socket supported by said drive outlet; and illumination means encircling, or substantially encircling, said drive outlet and arranged to direct light into the mixing bowl.

14 Claims, 4 Drawing Sheets

(56) References Cited

U.S. PATENT DOCUMENTS

| | | | |
|---|---|---|---|
| 6,168,284 B1 | 1/2001 | Wacker et al. | |
| 6,979,096 B2* | 12/2005 | Ortega | F25C 5/182 |
| | | | 362/101 |
| 2003/0179645 A1* | 9/2003 | Seul | A47J 43/07 |
| | | | 366/205 |
| 2011/0272506 A1* | 11/2011 | Boland | A47J 43/044 |
| | | | 241/98 |

FOREIGN PATENT DOCUMENTS

| | | |
|---|---|---|
| CN | 2783915 Y | 5/2006 |
| CN | 201341811 Y | 11/2009 |
| CN | 101677722 A | 3/2010 |
| CN | 201861482 U | 6/2011 |
| CN | 102325487 A | 1/2012 |
| EP | 2220980 A1 | 8/2010 |
| GB | 1464838 A | 2/1977 |
| JP | S55143121 A | 11/1980 |
| JP | 200540147 A | 2/2005 |
| JP | 2013132565 A | 7/2013 |

OTHER PUBLICATIONS

Search Report of the Great Britain Priority Application No. 1400345.3 dated Jul. 2, 2014.

Australian Examination Report dated Oct. 2, 2018 in corresponding Australian Application No. 2015205451.

Australian Examination Report dated Jan. 23, 2019 in corresponding Australian Application No. 2015205451 (3 pages).

Japanese Office Action dated Aug. 8, 2019 in corresponding Japanese Patent Application No. 2016-545285 (with English translation) (6 pages).

Examination Report for corresponding Application No. EP 19210763.9 dated Oct. 16, 2020 (5 Pages).

\* cited by examiner

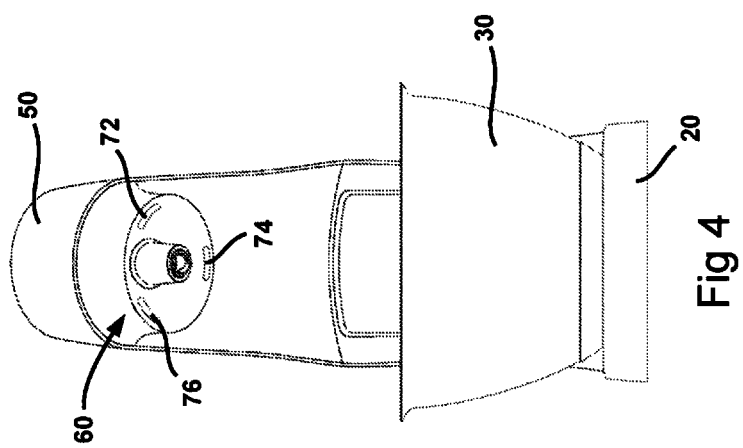
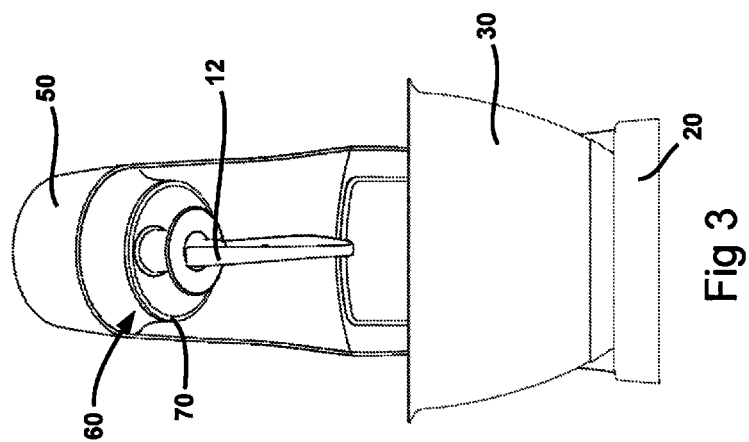

STAND MIXER ARRANGEMENTS

CROSS-REFERENCE TO RELATED APPLICATIONS

This application is a continuation of U.S. application Ser. No. 16/164,170, filed on Oct. 18, 2018, which is a continuation of U.S. application Ser. No. 15/110,237, filed on Jul. 7, 2016, now U.S. Pat. No. 10,542,843, issued on Jan. 28, 2020, which is a 371 U.S. National Stage of International Application No. PCT/GB2015/050039, filed on Jan. 9, 2015 and claims priority to Great Britain Application No. 1400345.3, filed on Jan. 9, 2014. The entire disclosures of the above applications are incorporated herein by reference.

BACKGROUND OF THE INVENTION

This invention relates to stand mixers, by which is meant the kind of motor-driven kitchen machine which is used to mix, or otherwise process, ingredients in a bowl by powered movement of one or more shanked tools which are suspended into the bowl from a head unit that carries a downwardly-facing rotary drive outlet, powered by the motor, and having a socket to which the shank, or shanks, of the tool, or tools can be fitted for use. The powered movement of the shanked tool or tools is often, though not necessarily, planetary in nature.

Such mixers conventionally comprise a generally C-shaped casing which provides a pedestal-like support for a mixing bowl, and a generally upright support portion supports the head unit so that it extends overhead of the bowl. Usually, the upright portion is hinged, to allow the head unit to be raised relative to the pedestal, so as to facilitate the fitment and removal of the tools to and from the socket in the rotary drive outlet.

Stand mixers such as the Kenwood Chef kitchen machine are well known and have been well established in use for many years. Over the years, mixers of this kind have been adapted and developed so as to perform an ever broadening range of functions, and many such appliances provide, for example, a plurality of additional drive outlets running at different speeds and with differing torque characteristics, thus enabling them to drive a number of attachments, such as blenders and mincers, which, between them, can perform a wide range of tasks. This is beneficial for the user, because a single machine can be used to selectively host several attachments and thus perform a range of tasks which would otherwise require the purchase and storage of several bespoke kitchen machines, each with their own motors and associated equipment.

Recent technical developments have provided stand mixers with a still broader operational capability, as it has been proposed to incorporate heating arrangements into such machines, thereby to enable foodstuffs to be heated whilst being stirred or mixed by the normal planetary mixing action of the stand mixer. Of course, the heating arrangements can be used or not, according to user requirements, and it will also be appreciated that the heating temperature and the heating time are both controllable, enabling the user to apply any desired degree of heating; for example sufficient to completely cook, to partially cook, or to merely warm ingredients.

In any event, when preparing food with a stand mixer, using the shanked tools and the bowl, it is greatly advantageous for the user to have good visibility of the ingredients in the bowl, as this provides the user with the ability to exert greater control over the preparation process. Light naturally entering the bowl from its working environment is reduced due to the constructional arrangement of a stand mixer which, as explained, has its head unit above the bowl and the tool or tools suspended from the downwardly-facing drive outlet.

Proposals have been made, for example as described in GB1464838 and in CN201861482, to increase the visibility of ingredients being worked in the bowl by incorporating an electrically powered light source mounted on the underside of the head unit of the appliance and offset from the drive outlet. Such a light source can provide useful additional light into the bowl, but only from a single direction. With arrangements as proposed in the aforementioned patent publications, the mixing tool in the bowl casts a shadow onto the ingredients on the side of the bowl opposite the light, thus compromising the visibility of the ingredients.

In some circumstances, moreover, it is desirable to provide a bowl cover, usually made of transparent plastics material, to reduce unwanted egress of steam and/or to prevent ingredients being ejected from the bowl or other receptacle in which they are being stirred and/or heated. With existing lighting arrangements, the bowl illumination is further compromised when the optional transparent bowl cover is fitted.

SUMMARY OF THE INVENTION

According to an aspect of the invention, there is provided a stand mixer arrangement including a pedestal for a mixing bowl; an electric motor and a drive system including a rotary drive outlet disposed overhead of the bowl, capable of imparting a mixing action to a tool suspended into the bowl from a socket supported by said drive outlet; and illumination means (preferably, the means comprising at least one light source) encircling, or substantially encircling, said drive outlet and arranged to direct light into the mixing bowl. The socket may be supported on the axis of the rotary drive outlet, or it may be offset from said axis so as to describe a circular orbit around the axis, enabling a tool supported from the socket to perform a planetary motion by executing rotation about the socket axis as well as being bodily rotated around the axis of the drive outlet.

In one preferred embodiment, the illumination means comprises an extended light source, such as an elongate filament and/or an array of discrete light sources, disposed under a common optically transmissive cover.

In another preferred embodiment, the illumination means comprises a plurality of separate light sources distributed around said drive outlet and each disposed under a respective optically transmissive cover.

In either event, there is provided improved illumination of ingredients within the bowl, because the light sources are positioned to encircle, or substantially encircle, the drive outlet, thereby significantly reducing the shadowing effect of the mixing tool.

Preferred embodiments incorporate the light source, or sources, into a single transparently-capped enclosure encircling the drive outlet.

The enclosure, or an annular cap therefor, preferably comprises a light-guide or lens to optimise the light emission for even illumination.

Where a bowl cover is provided, it is preferred that the cover is configured to transmit the illumination to the bowl, and in such circumstances the cover may be formed with an annular window region through which the illumination from said source or sources of light can pass. The window region may be apertured and/or include one or more elements formed as a lens or light-guide to enhance the illumination.

The light source(s) may be controlled manually to switch them on or off, and/or to vary the brightness level, for example by means of a user interface such as a control panel, or they may be controlled automatically for example by means of a control unit. The control unit may be in communication with one or more detectors arranged to detect a condition such as an ambient light level or change in the ambient light level, an illumination level of the light source(s) or a change therein, or the position or change in position of a head unit of the mixer where the mixer has a head unit extending over the bowl which may be lifted to facilitate access to the bowl and/or mixing tools.

Thus, the stand mixer may further comprise a control unit arranged to control the luminance of the illumination means, for example to actuate the illumination means to turn the light source(s) on or off, or to change the brightness or luminance of the illumination means. for example to dim or brighten the illumination provided. Where the illumination means comprises a plurality of light sources, one or more of the light sources or one or more groups of light sources may be controlled separately.

Preferably, the control unit controls the luminance of the illumination means in dependence upon at least one of the following parameters: a position of the drive outlet in relation to the pedestal; an ambient light level; a user input; power consumption of the stand mixer; and the illumination of the illumination means, or a change in any one of these parameters.

The invention extends to a stand mixer arrangement substantially as herein described with reference to and/or as shown in FIGS. 2-4.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

Any apparatus feature as described herein may also be provided as a method feature, and vice versa. As used herein, means plus function features may be expressed alternatively in terms of their corresponding structure, such as a suitably programmed processor and associated memory.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

In order that the invention may be clearly understood and readily carried into effect, embodiments thereof will now be described, by way of example only, with reference to the accompanying drawings, of which:

BRIEF DESCRIPTION OF THE DRAWINGS

FIG. 3 shows a front elevational view of the mixer of FIG. 2;

FIG. 4 shows a front elevational view of a mixer, and with the head raised; and

DESCRIPTION OF THE PREFERRED EMBODIMENTS

Figure 1A:
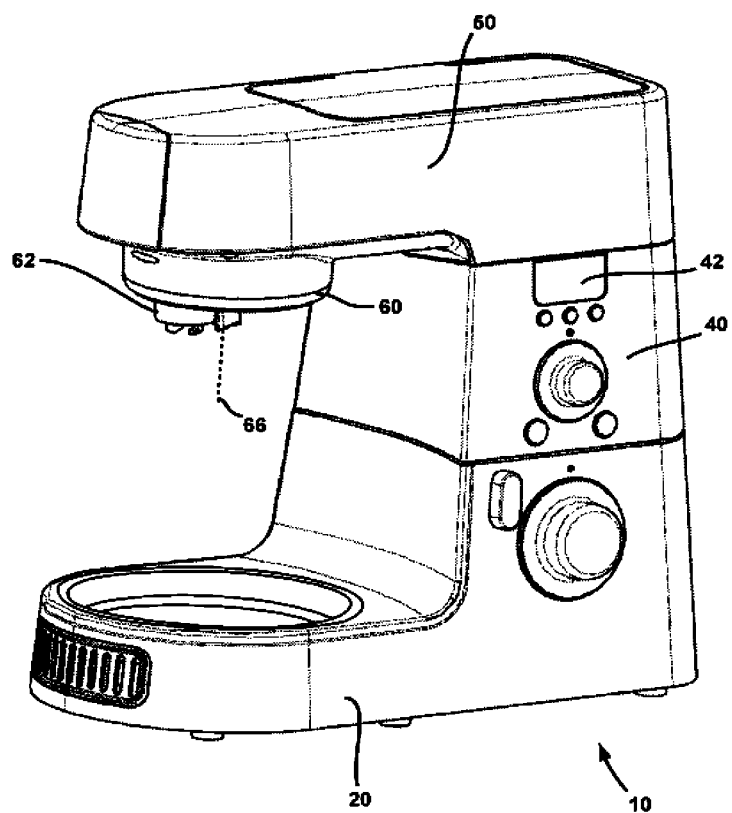
FIG. 1(a) shows, in perspective view, a typical stand mixer.
Figure 1B:
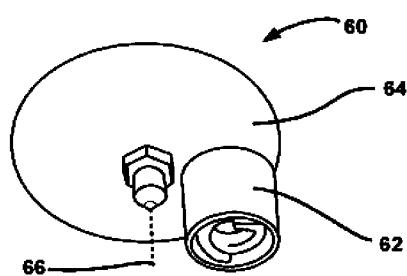
FIG. 1(b) shows a detail of the drive outlet on the head of the stand mixer.

Referring now to FIGS. 1(a) and 1(b), the stand mixer shown generally at 10 is a well-known and long-established piece of kitchen equipment. This particular mixer has a heating capability, but such capability is optional in relation to this invention.

Stand mixers typically comprise a generally C-shaped casing which provides a pedestal-like support 20 for a mixing bowl 30 (see FIGS. 2 to 4), and a generally upright support portion 40 supporting a head unit 50 that extends, for operation, overhead of the bowl 30. The upright portion 40 is formed in two parts that can pivot relative to one another, so as to allow the head unit 50 to be lifted to facilitate the installation of tools and the fitting and removal of the bowl 30, and the head unit 50 carries a downwardly-facing, motor-powered planetary drive outlet 60 to a socket 62 of which the shank of a kneading, whisking or other processing tool 12 (see FIGS. 2 and 3) is temporarily connected for use. The tool 12 is suspended from the socket 62 of the drive outlet 60 and reaches down into the bowl 30 to mix ingredients therein.

Stand mixers are versatile appliances, and typically provide, in addition to the aforementioned outlet 60 used to drive the shanked mixing tool 12, at least one further drive outlet for driving attachments with different speed and/or torque requirements, and configured for performing other tasks. Typically, such additional drive outlets may be set up to drive the operating tool of a high speed attachment, such as a food processor or a blender, or a low-speed/high torque attachment, such as a mincer.

Typically, and as best seen in FIG. 1(b), the drive outlet 60 of the stand mixer 10 comprises the socket 62 carried by a disc-shaped member 64 that itself is directly or indirectly driven from a gearbox in the head unit 50 so as to rotate, in a horizontal plane, relative to the head unit 50, about a vertical central axis 66 that is typically (though not necessarily) aligned with the central axis of the bowl 30. Thus a tool mounted with its shank inserted into the drive socket 60 is rotated about the axis of its shank, and is bodily rotated around the axis 66, thereby describing a planetary motion.

As mentioned above, the stand mixer 10 may also incorporate heating means (not shown, but usually accommodated within the base 20), enabling ingredients in the bowl 30 to be heated whilst being subjected to the mixing action. The heating mechanism, if provided, may be provided by any convenient agency or method.

Figure 2:
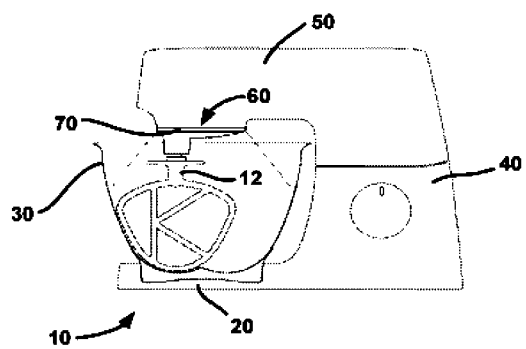
FIG. 2 shows, in side elevation, and with the head raised, a stand mixer provided with illumination.
Figure 5:
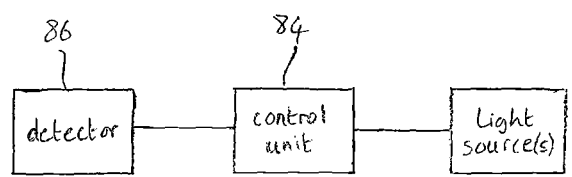
FIG. 5 is a diagram showing operation of a control unit.

Referring now additionally to FIGS. 2 and 3, a first embodiment utilises an extended, electrically powered light source 70 to provide improved illumination of the ingredients within the bowl. The light source encircles the drive outlet 60, thus also encircling the socket 62 and thereby reducing the shadow of the mixing tool 12. This significantly improves the illumination within the bowl. In this embodiment, the extended light source 70, which may comprise an elongate filament or an array of individual point sources, such as LEDs, is housed in the head unit 50 beneath a single transparently-capped enclosure, the cap of which may be formed as, or incorporate, a light-guide or lens around the gearbox outlet disc 64 of the gearbox outlet 60. Such a light-guide or lens, if provided, is configured to enhance the spread and orientation of the light so as to optimise the illumination of the contents of the bowl 30.

In a second embodiment, shown in FIG. 4, a plurality of separate light sources, 72, 74 and 76, each of which may comprise an elongate filament or one or more individual point sources, such as LEDs, are distributed around the outlet 60, again so as to substantially encircle the socket 62.

In both embodiments, it is preferred that the light sources 70 or 72, 74, 76 are mounted so as to remain stationary in the head unit whilst the disc 64 and the socket 62 rotate around the axis 66. If preferred, however, the light sources can be mounted so as to rotate with the disc 64.

In an alternative embodiment, the light sources 70, 72, 74, and 76 are automatically controlled by a control unit 84 in the stand mixer 10 to dim when the head unit 50 is in a lifted position. Where the light sources are LEDs, the control unit achieves this dimming by, for example, controlling the LEDs to dim using pulse-width modulation when it detects (by, for example, a switch in the stand mixer 10 being actuated) that the head unit 50 is raised. Dimming of the light sources 70, 72, 74, and 76 when the head unit 50 is lifted (and thus no longer casts a shadow on the bowl 30) prevents unnecessary brightness in the area of the bowl 30.

Alternatively, the control unit 84 uses feedback from a light-level sensor 86 located, for example, on a surface of the stand mixer 10 in the vicinity of the bowl 30, to control the light sources 70, 72, 74, and 76 to provide an appropriate level of illumination based on ambient light conditions, thus avoiding excessive brightness or dimness in the area of the bowl 30 due to ambient light conditions. Manual control of the brightness-level of the light sources 70, 72, 74, and 76 is also optionally provided through a user interface 42 of the stand mixer 10.

Where multiple light sources are used, each light source optionally has its own individual power-supply, drive, or control circuit. Alternatively, each group of two or more light sources has its own dedicated power-supply, drive, or control circuit. These groups are comprised of neighbouring light sources, or, for example, the light sources are divided into four groups where every fourth light source, counting along a row of light sources, belongs to a given group. Advantageously, this multiple redundancy helps prevent a single-source failure of the entire lighting array.

Optionally, the control unit of the stand mixer 10 detects a condition of the light source(s), such as the failure of a light source (or group of light sources) by, for example, a change in the illumination level in the area of the bowl 30 being detected by a sensor providing feedback to the control unit, and in response drive the remaining light sources (or light sources within the group in which a light source has failed) to emit more light in order to compensate, thus preventing uneven or excessively dim illumination. Alternatively, failure-detection is achieved through detecting changes in power-consumption amongst the light sources or by other methods known in the art.

In the foregoing embodiments, no transparent bowl cover is positioned between the lights and bowl, so naturally the illumination provided by the light sources 70 or 72, 74 and 76 is not compromised thereby.

In the event that a transparent bowl cover 80 is positioned between the lights and bowl, the cover is preferably designed so that the illumination is not compromised thereby. This can be achieved, for example, by designing the cover to have an annular gap 82 in alignment with the light source, or sources, with thin spider-web features holding the parts of the cover to either side of the annular gap. Alternatively, the cover can be designed to incorporate an annular lens-like feature to assist in directing the light into the required areas of the bowl 30.

The light sources in the foregoing embodiments are powered (via voltage-changing and/or transforming circuitry if necessary) from the mains electricity supply connected to the stand mixer. This need not be the case, however, and the light sources may, if preferred be powered by any other means, including batteries (single-use or rechargeable), solar cells and/or so-called "supercapacitor" drivers, i.e. drive circuits employing dual-layer capacitors or similar devices.

It will be understood that the present invention has been described above purely by way of example, and modifications of detail can be made within the scope of the invention.

Each feature disclosed in the description, and (where appropriate) the claims and drawings may be provided independently or in any appropriate combination.

Reference numerals appearing in the claims are by way of illustration only and shall have no limiting effect on the scope of the claims.

The invention claimed is:

1. A stand mixer apparatus for mixing food ingredients in a mixing bowl comprising:
   a mixing bowl;
   a pedestal configured to removably receive the mixing bowl;
   a head unit supported overhead the pedestal, and attached to the pedestal, by a stand unit;
   an electric motor and a drive system including a rotary drive outlet disposed overhead of the mixing bowl and arranged to impart a mixing action to a tool supported by said rotary drive outlet, wherein the rotary drive outlet is disposed in the heed unit; and
   an illumination arrangement including at least one point light source incorporated into a single transparent enclosure encircling the rotary drive outlet and arranged to direct light into the mixing bowl when the mixing bowl is located on the pedestal, the enclosure having a cap that is configured to enhance the spread of light from the at least one point light source.

2. An apparatus according to claim 1, wherein said illumination arrangement comprises a plurality of point light sources incorporated into the single transparent enclosure encircling the rotary drive outlet.

3. An apparatus according to claim 2, wherein said enclosure, or the annular cap thereover, comprises optical means configured to optimise the light emission for even illumination.

4. An apparatus according to claim 3, wherein said optical means comprises one of a light-guide or a lens.

5. An apparatus according to claim 1, wherein a cover is provided for said mixing bowl, and wherein said cover is configured to transmit the illumination from said illumination arrangement into the mixing bowl.

6. An apparatus according to claim 5, wherein said cover is formed with an annular window region through which the illumination from said illumination arrangement can pass.

7. An apparatus according to claim 6, wherein said window region comprises an aperture formed in said cover.

8. An apparatus according to claim 6, wherein said window region includes one or more optical elements formed as a lens or light-guide to enhance the illumination of said mixing bowl.

9. An apparatus according to claim 1 further comprising a control unit arranged to control the illumination arrangement.

10. An apparatus according to claim 9, wherein the control unit is arranged to actuate the illumination arrangement and/or to vary the level of luminance provided by the illumination arrangement.

11. An apparatus according to claim 9, wherein the control unit is arranged to control the illumination arrangement in dependence upon at least one of: a position of the rotary drive outlet; an ambient light level; a user input; power consumption of the stand mixer; and/or an illumination level of the illumination arrangement.

12. An apparatus as claimed in claim 11, comprising at least one detector in communication with the control unit and arranged to detect at least one of: a position or change in the position of the rotary drive outlet in relation to the pedestal; an ambient light level or change in an ambient light level; a user input; power consumption or change in power consumption of the stand mixer and/or the illumination arrangement; an illumination level or change in illumination level of the illumination arrangement.

13. An apparatus according to claim 1, wherein the apparatus is configured and arranged for the head unit to be displaceable relative to the pedestal.

14. An apparatus according to claim 13, wherein the head unit is configured to hinge relative to the pedestal.

* * * * *